May 8, 1934.   D. P. LAVIETES   1,957,968
SMOKING PIPE
Filed Dec. 29, 1931
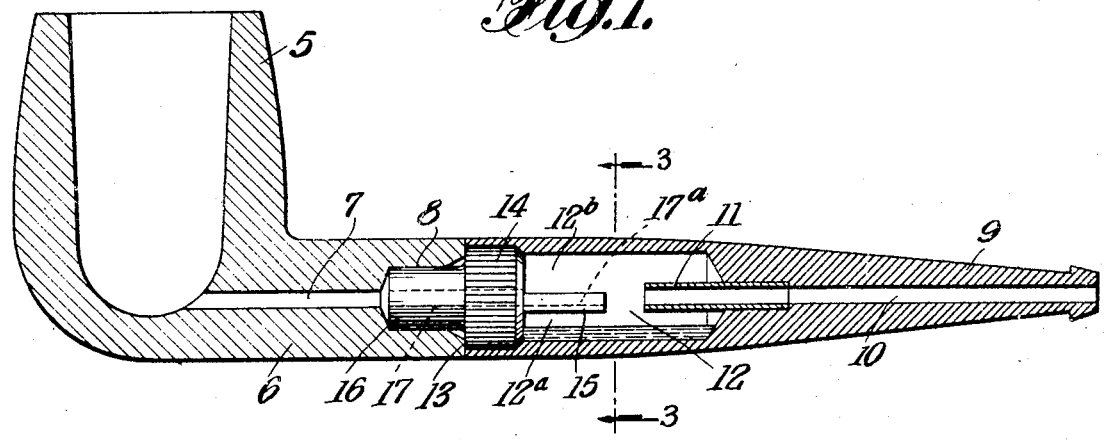
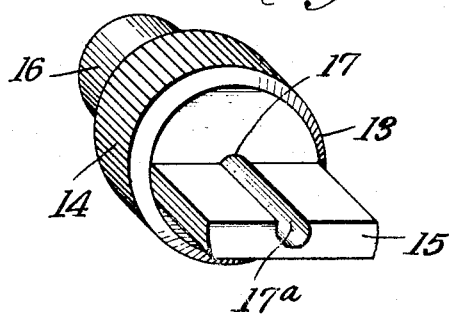
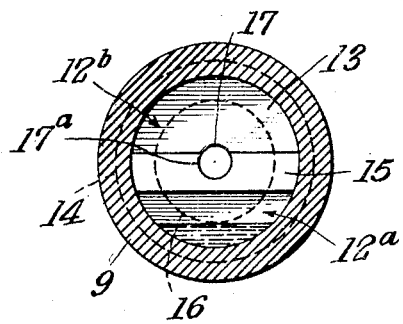
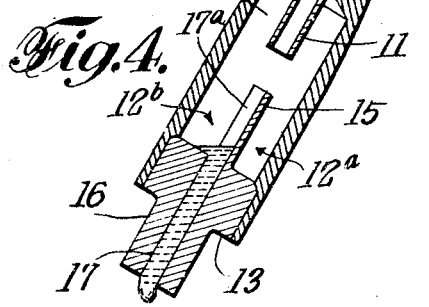
INVENTOR
David P. Lavietes
BY
Percy Freeman
ATTORNEY Patented May 8, 1934

1,957,968

UNITED STATES PATENT OFFICE 1,957,968

SMOKING PIPE

David P. Lavietes, Brooklyn, N. Y.

Application December 29, 1931, Serial No. 583,715

5 Claims. (Cl. 131—12)

This invention relates to smoker's pipes and particularly to the stems or bits for such pipes.

While the invention is described and shown as used in connection with a pipe, it will be understood that its applicability extends likewise to cigar holders, cigarette holders and any other implements or devices requiring the use of a mouth piece.

The invention has for its major object the provision in such a stem, bit or mouth piece of a trap for moisture or liquor which frequently accumulates due to condensation or due to the dripping of saliva through the mouth piece.

A further object is to provide in a stem, bit or mouth piece, a trap adapted to prevent the passage of any of the liquor accumulation to the mouth of the smoker or user, and to promote a cool smoke.

Another object is the provision of a pipe of simple construction and in which the liquor trap is formed wholly within the stem which when separated from the bowl may be readily emptied by inverting and shaking.

A further object is to provide in a pipe having a liquor trap, a member in the stem having a baffle extending into the trap to prevent accumulated liquor in the trap from reentering the bowl portion of the pipe.

These and other objects which will hereinafter appear are accomplished by the novel design, construction and arrangement of parts hereinafter described and shown in the accompanying drawing forming a material part of this disclosure, and in which:

Fig. 1 illustrates a longitudinal sectional view through a smoker's pipe showing an embodiment of the invention.

Fig. 2 is a perspective view of the trap closure member and its baffle.

Fig. 3 depicts a cross-sectional view through the trap and is shown as taken along line 3—3 of Fig. 1.

Fig. 4 shows a partial sectional view of the pipe stem and indicates how the liquor may be drained therefrom.

Referring to the drawing in greater detail there is shown at 5 the bowl of a smoker's pipe provided with the usual cavity to receive tobacco and having an extension 6. The extension is provided with a smoke passage 7 and is counterbored at 8 in the usual manner.

The otherwise conventional bit or stem 9, is provided with a longitudinal smoke passage 10 which is shown as being provided with a tube 11 extending into the liquor trap or chamber 12 formed in the stem. It may be desirable to form the tube 11 integrally with the stem, but in any event it is preferred that the tube passage be in axial alignment with the passage 10.

At 13 there is shown a member having a knurled or otherwise roughened periphery 14 which may be permanently fitted into the open end of the stem to complete the closure for the trap 12. Should the stem 9 be made of amber or bone or of such other non-moulded material, the member 13 may be driven into place and the knurling 14 acts to prevent accidental turning and insures permanence of assembly; should the stem be moulded as of bakelite or rubber and the member 13 used as an insert, the knurling 14 would have the same function as above mentioned.

The member 13 is preferably formed with a vane or baffle 15 which projects into and extends across the trap 12, as most clearly shown in Fig. 3, to divide the trap into sub-compartments 12a and 12b.

The member 13 is also provided with a shank 16 which may be tightly pushed into the counterbore 8 of the bowl extension 6 or the shank 16 may be threaded for engagement with a tapped thread in the extension 6 of the bowl.

A passage 17 is provided longitudinally through the member 13 and its projecting shank 16 and vane 15, and this passage is preferably co-axial with the passage 7 of the bowl extension 6 and the passage 10 of the stem 9.

However, it is desirable that the passage 17 communicate with the sub-compartment 12b at a point adjacent the inner wall of the member 13, i. e., at the point where the vane 15 joins the member 13 and for this purpose the passage 17 is formed as a through like channel 17a. The vane 15 may be so positioned as to obviate the necessity of channeling it or it may be provided with a passage which may communicate with the sub-compartment 12b through cross connecting holes.

It is to be noted (Fig. 1) that the passages 7, 17, 17a and 10 are all in alignment, so that without disassembling the pipe, a pipe cleaner may be used to swab these various passages.

With the parts assembled as above described, the moisture or liquor which would normally accumulate during smoking would be trapped in the trap 12 and could not pass back into the bowl or into the mouth of the smoker. Should the bowl be tipped down the liquor would be trapped in the sub-compartment 12a and should the bowl be tipped up, the liquor would be trapped in the trap 12 immediately surrounding the tube 11.

When it is desired to drain the liquor from the trap 12, the stem is separated from the bowl. Then by tipping the stem so the liquor surrounds the tube 11, rotating it 180° and holding the stem with the shank 16 pointing downwardly as shown in Fig. 4, the liquor will be drained through the channel 17a and passage 17. One or two shakes would remove all the liquor in the trap. The parts may now be reassembled and the pipe is now clean and ready for use.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In a smoker's pipe, a bowl, a stem having a liquor trap, a closure member for the liquor trap, and a vane projecting into and bi-secting a portion of the trap, said closure member forming means to detachably connect the bowl and stem, said bowl, stem, closure member and vane having aligned passages.

2. In a smoker's pipe having a bowl and a stem, said stem being provided with a chamber to form a liquor trap, an apertured closure member for the trap, said closure member forming means to detachably secure the bowl to the stem and a channeled vane arranged to bi-sect a portion of said trap.

3. In a smoker's pipe having a bowl and a stem provided with a liquor trapping chamber, a vane extending into the chamber, said vane being channeled on one side to afford an exit for the liquor from the chamber.

4. A smoker's pipe, comprising a bowl, a stem, a closure member, said closure member forming means to detachably secure the stem to the bowl and a liquor trap in the stem, said trap being defined by the walls of a chamber in the stem, and the inner walls of the closure member, a tube projecting into one portion of the chamber and a vane bi-secting the other, said vane having a channel which connects with a passage in the closure member.

5. In a smoker's pipe having a bowl and a stem, said stem being provided with a chamber to provide a liquor trap, an apertured closure member for the trap, said closure member forming means to detachably secure the bowl and stem and a vane arranged to bi-sect a portion of said trap and to "clear" the aperture.

DAVID P. LAVIETES.